United States Patent [19]

Watanabe

[11] E Re. 31,548

[45] Reissued Apr. 3, 1984

[54] DENTAL OPERATORY SYSTEM

[75] Inventor: Tony Watanabe, Redondo Beach, Calif.

[73] Assignee: Takara Company, New York, Inc., Somerset, N.J.

[21] Appl. No.: 465,433

[22] Filed: Feb. 7, 1983

Related U.S. Patent Documents

Reissue of:

[64] Patent No.: 4,332,557
Issued: Jun. 1, 1982
Appl. No.: 199,516
Filed: Oct. 22, 1980

U.S. Applications:

[63] Continuation-in-part of Ser. No. 122,565, Feb. 19, 1980, abandoned.

[51] Int. Cl.[3] ..... A61C 1/14
[52] U.S. Cl. ..... 433/77
[58] Field of Search ..... 433/77, 78, 79

[56] References Cited

U.S. PATENT DOCUMENTS

| | | | |
|---|---|---|---|
| 3,250,583 | 5/1966 | Sharp et al. | 433/78 |
| 3,295,206 | 1/1967 | Sharp et al. | 433/78 |
| 3,922,788 | 12/1975 | Rota | 433/77 |

*Primary Examiner*—Robert Peshock
*Attorney, Agent, or Firm*—Stephen E. Feldman

[57] ABSTRACT

A dental operatory system is disclosed which converts generalized space to a multi-operatory dental clinic at minimum expense. Each dental operatory unit is generally L-shaped and forms a wall-like partition structure between a first operatory and a second operatory. The L-shaped structure incorporates lead-lined protective panels. An x-ray unit and light unit are mounted so as to be accessible to each operatory. Drawers are also cooperatively mounted to ease of access by the dentist or assistant in each operatory.

35 Claims, 10 Drawing Figures

DENTAL OPERATORY SYSTEM

Matter enclosed in heavy brackets [ ] appears in the original patent but forms no part of this reissue specification; matter printed in italics indicates the additions made by reissue.

CROSS REFERENCED RELATED APPLICATIONS

[This] *The present* application is *for Reissue of United States Patent No. 4,332,557 issued to Tony Watanabe on June 1, 1982 from application Ser. No. 199,516 filed October 22, 1980, as* a continuation-in-part of [my related] application Ser. No. 122,565 filed Feb. 19, 1980 and now abandoned.

FIELD OF THE INVENTION

This invention generally relates to a dental operatory system.

BACKGROUND OF THE INVENTION AND DISCUSSION OF PRIOR ART

Heretofore, dental operatory systems have attempted to duplicate the conditions and facilities which exist when a dental operatory is installed in a room such as used by an individual dental operator. In fact, it is still the practice in some instances to construct a multiplicity of small rooms for use as separate dental operatories.

The systems which are based on the foregoing description generally do not share equipment with adjacent operatories nor do they provide for movement into and out of the operatory area by more than one exit or entrance.

Some of the prior art patents which concern themselves with dental operatory systems are U.S. Pat. Nos. 4,095,379; 3,922,788; 3,524,256; 3,497,955; 3,455,620; 3,250,583; 3,229,368 and 3,111,759.

Also pertinent is a dental operatory system made available by the Den-tal EZ Co., the G15 System, requiring two operatory modules for each dental operatory.

OBJECTS OF THE INVENTION

It is an object of the present invention to provide an improved dental operatory system.

Another object is to provide a dental operatory system which can be used as a basic module for multi-operatory dental offices.

A further object is to provide a dental operatory system as aforesaid with units in which two or more dental operators can simultaneous utilize.

An additional object is to provide a dental operatory system which is more efficient and less costly than prior art systems.

Still another important object is to provide a dental operatory system in which personnel on either side of a partition structure have common access to common dental appliances.

Still a further object is to save time and effort in a dental office by providing a more efficient dental operatory.

Yet another object is to provide a portion of the operatory structure having facilities for use by a dental assistant.

Yet an additional object is to provide another portion of the structure having multiple requisite facilities for use by a dental operator.

Yet another object is to conveniently and easily convert a given area into a modern dental clinic by installing a plurality of movable partition structures such as herein described.

A BRIEF DESCRIPTION OF THE INVENTION

The operatory of the present invention incorporates a multi-functional integral L-shaped operatory unit for simultaneously serving multiple operatory needs.

Each generally L-shaped operatory of the present invention provides everything needed by each set of the dental operators, (that is each dentist and his assistant), thereby preventing each from crossing over into the others area. Eliminating the crossover results in greater efficiency and productivity.

Therefore, one side of the present invention contains the assistant's cabinetry and equipment whereas the other side contains the doctor's cabinetry and equipment. When the present invention is used in multiple operatory arrangements each side of the structure provides the needs of each respective operator.

BRIEF DESCRIPTION OF THE DRAWINGS

In the accompanying drawings in which is shown one of the various possible embodiments of the invention.

DETAILED DESCRIPTION OF THE PREFERRED EMBODIMENTS

Figure 1:
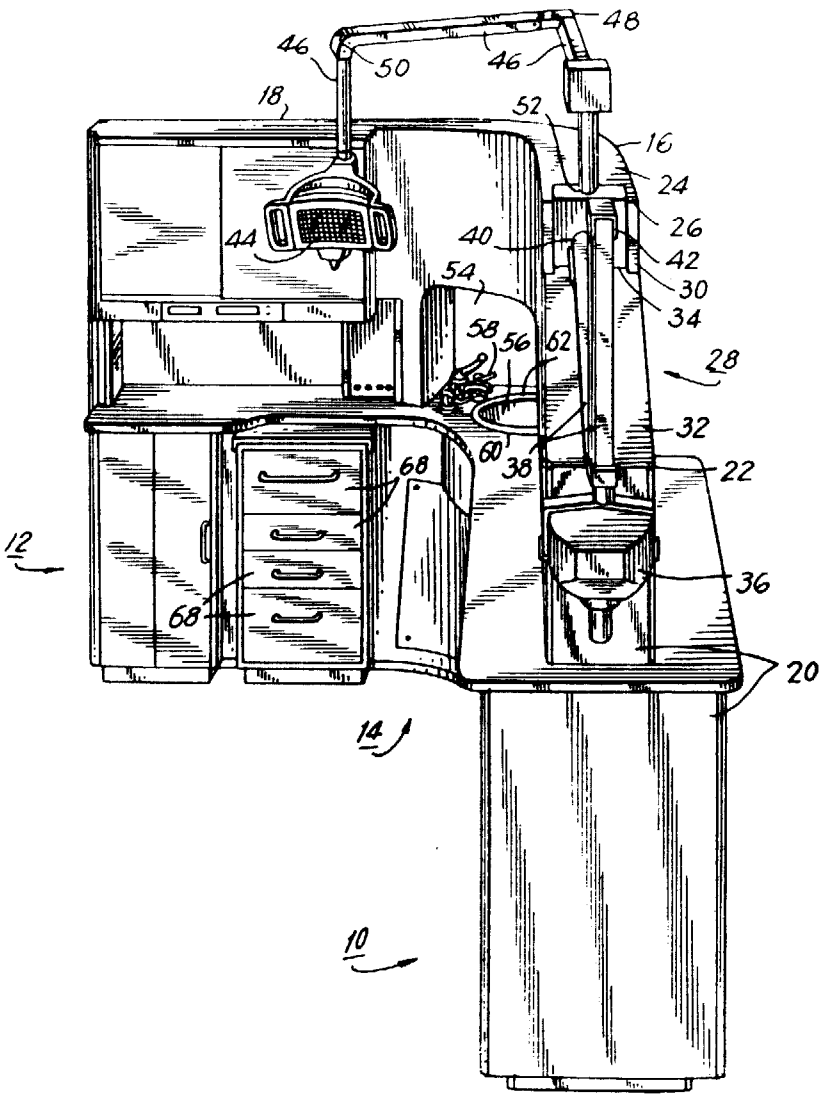
FIG. 1 is a front perspective view of the first dental operatory system.
Figure 2:
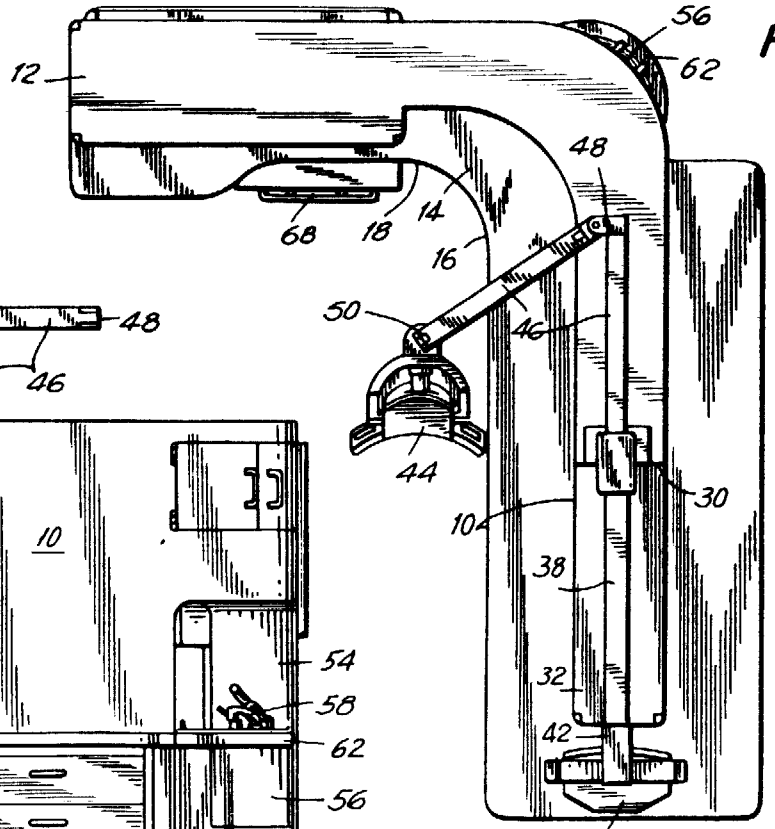
FIG. 2 is a top plan view of the first dental operatory system.

Referring now to the Figures, the first dental operatory system includes, viewed in toto, a unitary generally L-shaped partition structure as shown in the Figures. The present partition structure is characterized by the provision of a first upright vertical flat planar partition, generally designated as 10, and a second upright vertical flat planar partition, generally designated as 12. The partitions 10 and 12, as shown, are generally perpendicular to each other and of generally equal height. A curved partition, generally designated as 14, is disposed between the partitions 10 and 12. The curved partition 14 extends between the inner end 16 of the first partition 10 and the inner end 18 of the second partition 12, so that the partitions 10 and 12 are joined by the partition 14 into a unitary entity capable of being disposed in an upright orientation (as shown) in a room.

The outer edge 20 of the partition 10 terminates at 22 below the upper edge 24 of the first partition 10, and the upper edge 24 of the first partition 10 terminates at 26 short of the outer edge 20 of the partition 10, so that a rectangular recess generally designated as 28 is provided in the upper outer corner of the first partition 10. This recess 28 is defined by a vertical wall 30 which depends from the outer end 26 of the upper edge 24 of the first partition 10, and a horizontal wall 32 which extends from the lower end 34 of the vertical wall 30 to the upper end 22 of the outer edge 20 of the first partition 10.

A common dental X-ray apparatus 36 is provided, the X-ray apparatus 36 being accessible to dental operators, not shown, on either side of partition 10. Thus, the X-ray apparatus 36 is suspended from a first pivotable bracket 38 which is mounted and attached to the first partition 10 proximately at the vertical wall 30, i.e. at 40, and is pivotable at 42 and 40. As shown, at least a portion of the first bracket 38 extends out of the recess 28.

A dental operatory lamp 44 is suspended from a second pivotable bracket 46, the bracket 46 being pivotable at 48 and 50 and being mounted and attached at 52 to the top edge 24 of the first partition 10 proximately at the vertical wall 30, i.e. at 26. The lamp 44 may alternatively be fixedly mounted to 10.

The curved partition 14 has a through opening 54 proximately at its middle region. A common sink 56 is mounted to the curved partition 14 at the through opening 54, so that the sink 56 is accessible to dental operators on either side of the first partition 10 without entering the other respective operatory. A common faucet 58 is provided to pass water or other liquid to the common sink 56, the common faucet 58 being disposed, as shown, indermediate the opposite sides 60, 62 of the common sink 56, so that the common faucet 58 is accessible to dental operators on either side of the first partition 10 without entering the other respective operatory.

Figure 3:
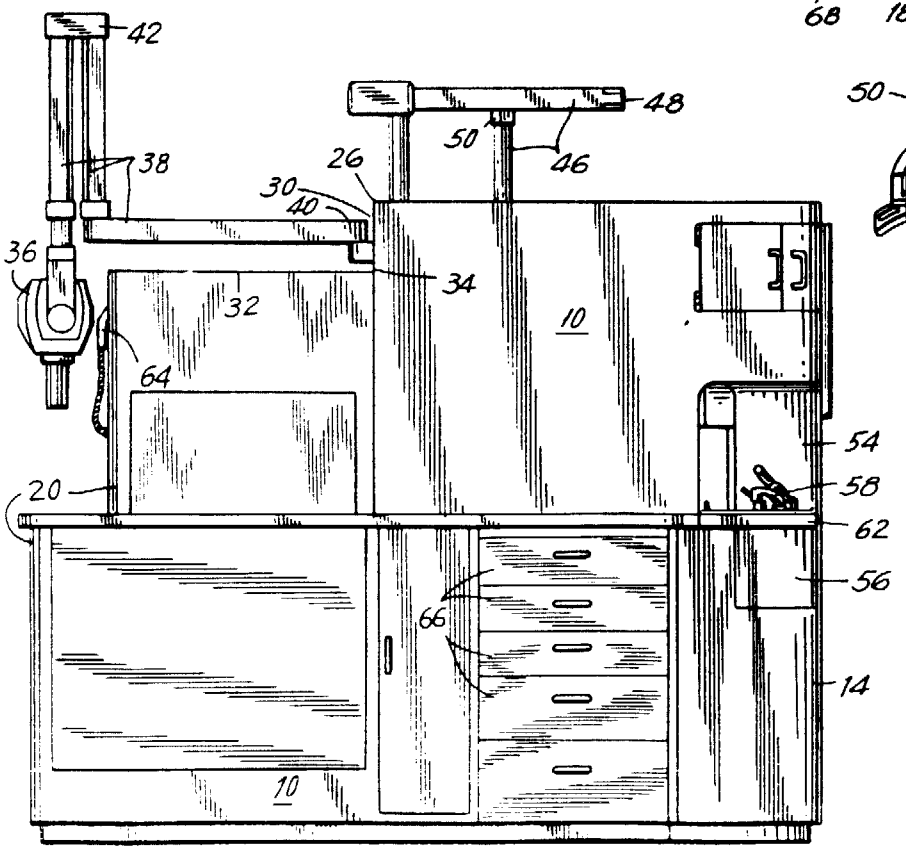
FIG. 3 is an elevation view of the outer side of the partition structure of the first dental operatory system.
Figure 4:
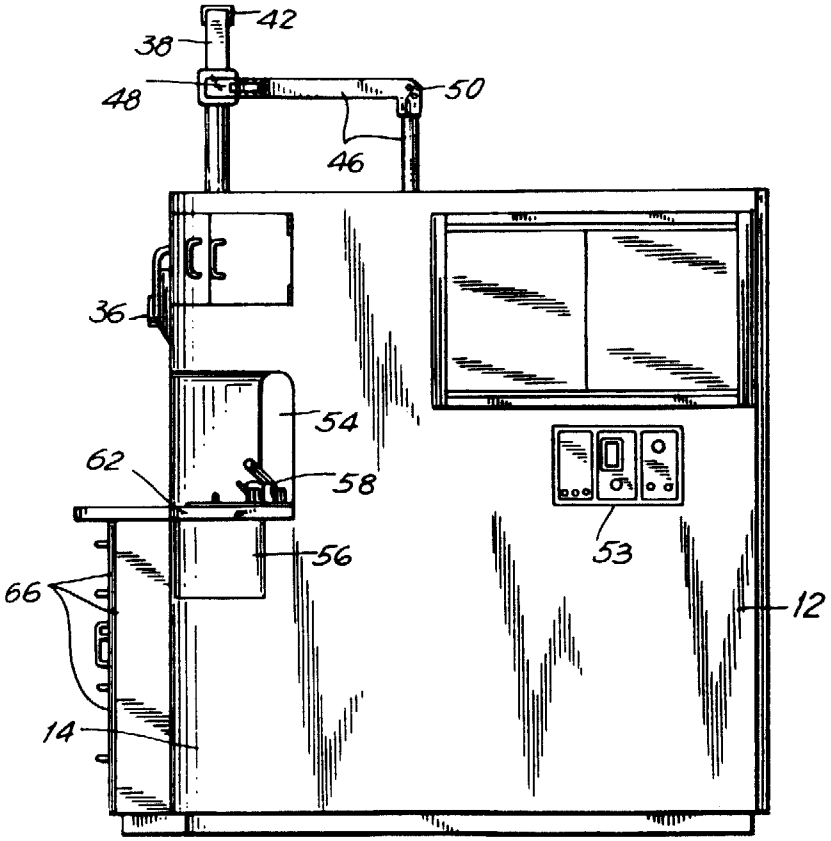
FIG. 4 shows the rear side of the first system in elevation view.
Figure 6:
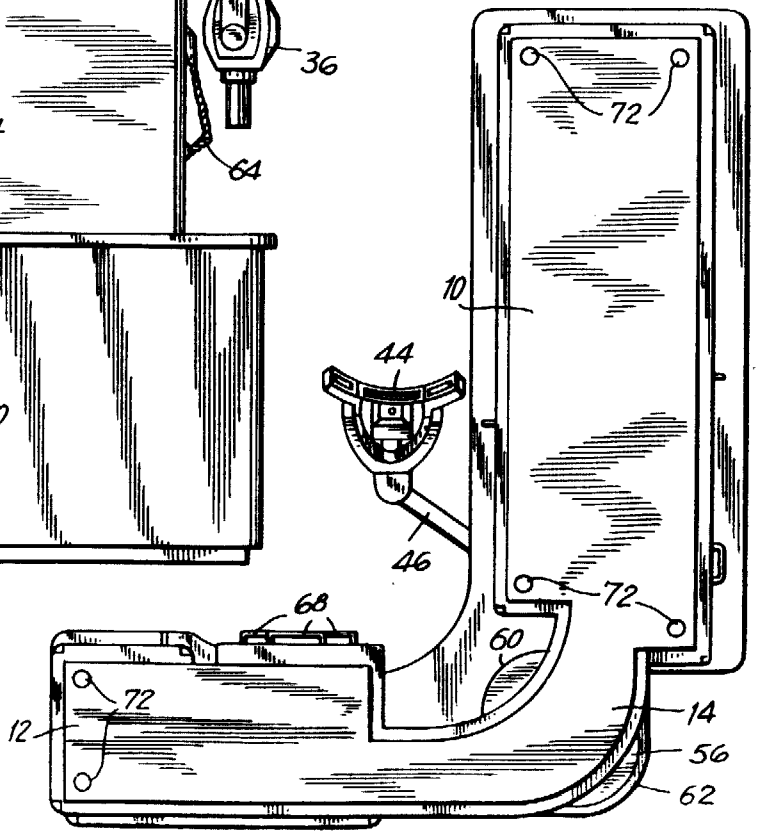
FIG. 6 is a bottom plan view of the first dental operatory system.
Figure 5:
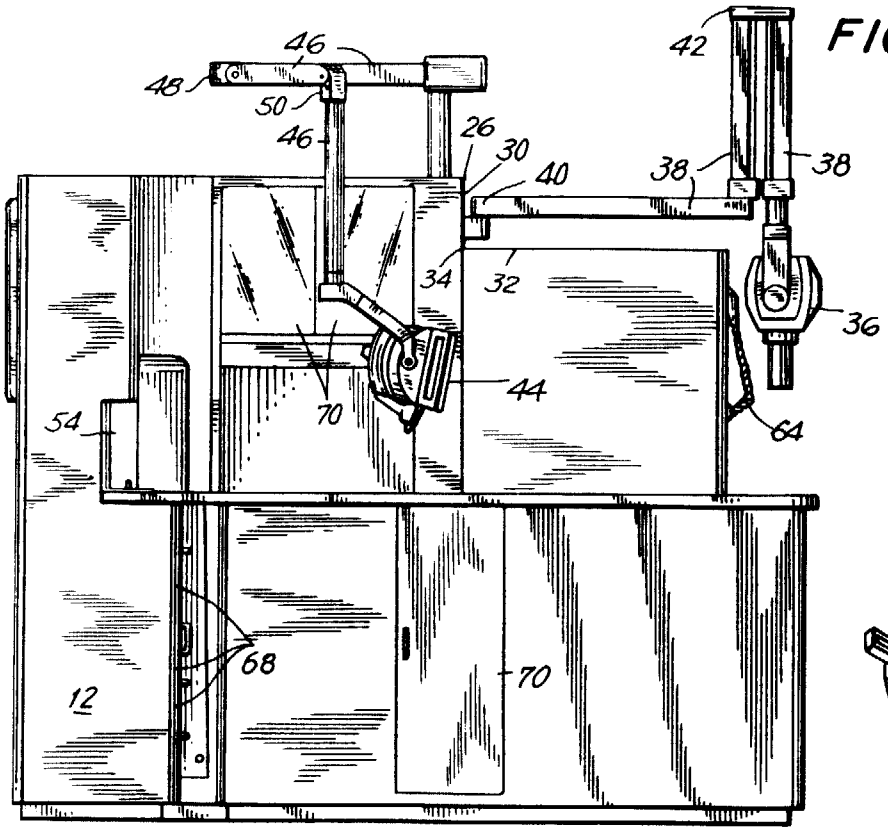
FIG. 5 shows the inner side of the first system in elevation view.

A dental operatory tool 64 (FIGS. 3 and 5) is mounted to the first partition 10 below the rectangular recess 28. A first plurality of drawers 66 (FIG. 3) constituting a first means for containing dental accessories is integral with the first partition 10 and disposed in the first partition 10 below the level of the rectangular recess 28. A second plurality of drawers 68 constituting a second means for containing dental accessories is integral with the second partition 12 and disposed in the second partition 12 on the inner side of the second partition 12, as shown. Additional drawers or cabinets 70 (FIG. 5) may be provided on the inner side of the first partition 10. The entire partition structure may be readily and detachably attached to the floor of a room or other enclosure by means of bolt holes 72 (FIG. 6).

It is evident that the pivotable bracket 38 constitutes a means for mounting the common dental appliance, consisting of X-ray apparatus 36, on the partition structure 10 for swinging movement between the first and second dental operatories respectively on the inner and outer sides of the first partition 10. Thus, common accessibility of the apparatus 36 is granted to both dental operators. It is also apparent that the common sink 56 in the through cutout opening 54, which opening extends through the partition structure to opposite sides thereof, is also accessible to both dental operators. Thus, either the first dental operator on the inner side of partition 10 (the inner side being designated with cabinets 70, FIG. 5, and with the dental operatory lamp 44), or the second dental operator on the outer side of partition 10 (the outer side being shown with drawers 66), has common access to the common sink and common dental appliances without the necessity for entering the other respective operatory on the opposite side of partition structure 10.

It should also be noted that the pivotable bracket 38, constituting a means for mounting the common dental appliance 36, mounts the same on a pivotable mounting 40 in the recess 28 proximately at the top of the partition 10, at a location characterized by recess 28 so that the common dental appliance 36 is free from mechanical interference with any part of the partition structure 10 during transfer of the common dental appliance 36 between the dental operatories on either side of partition structure 10.

It thus will be seen that there is provided a dental operatory system which achieves the various objects of the invention and which is well adapted to meet the conditions of practical use.

A unitized second dental operatory system showing two adjacent operatories generally designated 110 and 110A, defining operatories areas 301 and 301A, respectively is shown in FIGS. 7-10.

Operatories 110 and 110A have similar features with similar distinction number designations, with the suffix "A". Operatory 110 is seen to have a straight portion 112 joined to a curved portion 114 which in turn is joined to a shorter straight portion 116 to form the wall 190.

A dental operatory lamp 118 is shown pivotably attached to the top most part 201 of cabinet 221 of straight portion 114. An X-ray unit 120 is shown pivotably attached to a vertical part 203 of cabinet 202 of straight portion 112. In this manner of construction lamp unit 118 and x-ray 120 may be pivoted and serve operation areas 301 and 301A respectively.

A delivery drawer unit is shown to dispose the outer side of straight portion 112. Extending from shorter straight portion 116 is an assistant's unit 124 containing dental tools and materials used by the dental operators.

Figure 7:
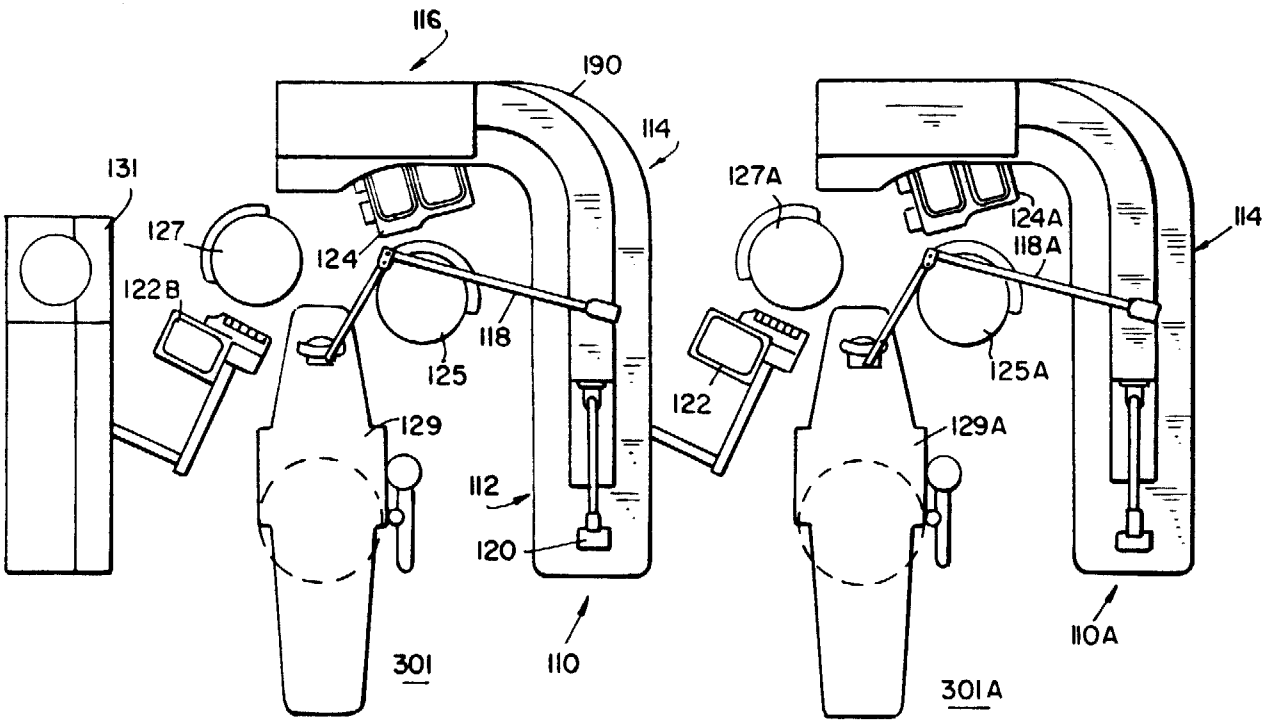
FIG. 7 is a plan view of the second dental operatory.

An assistant stool 126 and a doctor stool 128 are shown in disposition to a dental chair 130 in dental space 110. In the left portion of FIG. 7 is seen a starting unit 131 having attached thereto a side delivery unit 122B.

Straight portion 112 is further comprising a base section 126 having attached an upper section 128. Upper section 128 is seen to pivotably support lamp 118 and x-ray unit 120 as aforesaid. A portion of upper section 128 has an inwardly facing first cabinet 130 and directly below and within base section 126 is a first drawer set 132 and a single drawer 134.

Shorter straight portion 116 is seen to consist of a second base section 136 having attached a second upper section 138. Upper section 138 is further seen to comprise a second cabinet 140 having a pair of transparent sliding doors 142. Cabinet 140 contains a series of horizontal shelves 144 and a vertically disposed compartment 140. Immediately below cabinet 140 is a power section 146 which is seen with greater detail in FIG. 10. Below power section 146 and proximate to a counter top 148 is an intercommunication system 150. Alongside intercommunication system 150 and vertically arranged is a series of plug-in connections 152. Further, located at the end of straight portion 116 is a compartment for installation of analgesia equipment. This compartment comprises a front portion 156 which is pivotally attached by a hinge 158 so that when a handle 159 is pulled forward, compartment opens for access to the analgesia equipment. Alongside the compartment is the dental assistant's unit 124 which is pivotally secured to second base section 136 by a set of arms 160. Therefore, unit 124 can be pulled out for use or pushed into the recess provided in shorter straight portion 116.

Curved portion 114 serves to provide support and rigidity to portion 112 and portion 116. The required rigidity is derived from double steel wall curved portions 206 and 208 being interconnected by an intermediate portion 207. Just above opening 162 is an intermediate portion (not shown) similar to portion 207. The aforedescribed portions are attached together by spot welding means or other fastening means to form a rigid box structure. Curved portion 114 has an opening 162 which provides accessibility to a sink 164 located on counter top 148. Counter top 148 begins at shorter straight portion 116 and continues through curved portion 114 and thence to straight portion 112. Sink 164 is therefore accessible from either side of operatory 110 as can be seen when reference is made to FIG. 8 and FIG. 9. Sink 164 has proximate one of the side walls secured a faucet set 166 which is shown positioned so as to also be easily accessible from either side of operatory 110. Alongside sink 164 is an opening 165 which provides access to a waste receptacle (not shown). Below sink 164 is located a pair of access doors 168 which provide an opening in the cabinet for plumbing connections to sink 164 and faucet set 166.

Figure 9:
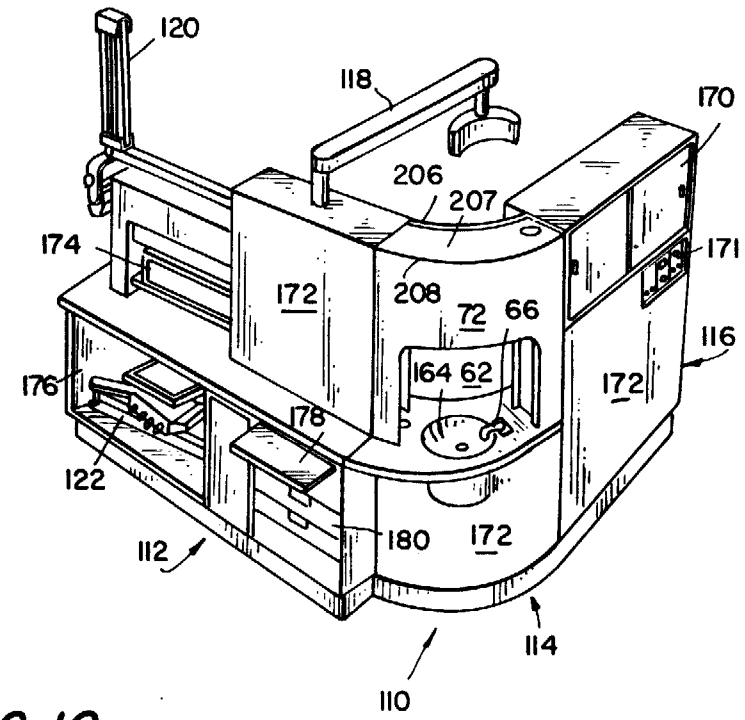
FIG. 9 is a perspective elevational view of the outer side of the second dental operatory.
Figure 8:
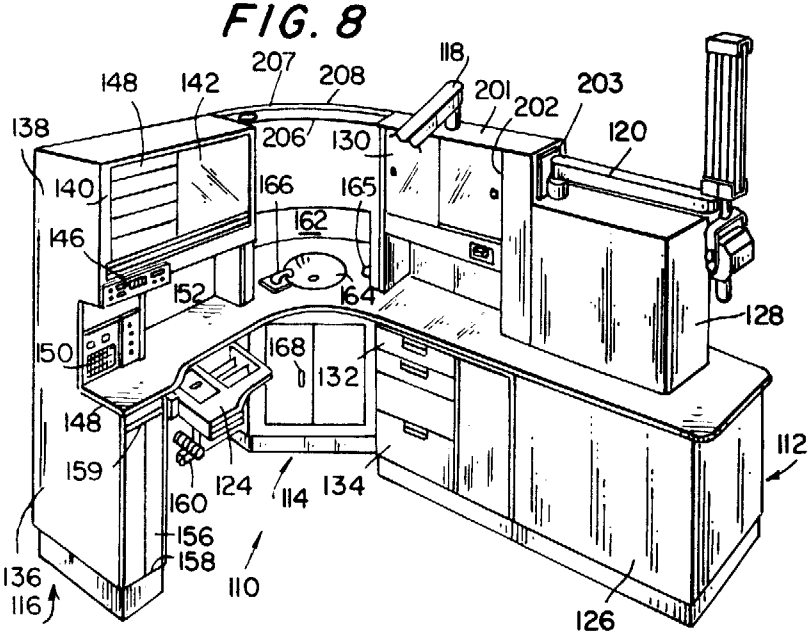
FIG. 8 is a perspective elevational view of the inner side of the second dental operatory.

FIG. 9 shows a number of items which are not shown in FIG. 8 and will therefore be described. Located on the outside of generally L-shaped operatory 110 and in the upper part of portion 116 are a pair of sliding opaque doors 170. Opaque doors 170 provide rear access to second cabinet 140 (best seen in FIG. 9) for records delivery. Below opaque doors 170 and in the rear wall is found an X-ray control unit 171. Opaque doors 170, the rear portion of shorter straight portion 116, the rear of curved portion 114 and the upper part of straight portion 112, contain an x-ray shielding material 172 which provides protection for an operator using control unit 171.

The rear part of straight portion 112 of operatory 110 comprises an X-ray film viewer 174 and below, contained within a storage compartment 176 is side delivery unit 122. Further, there is seen a pull out shelf 178 and a second drawer set 180 which is made to fit between first drawer set 132 and single drawer 134 both best seen in FIG. 8.

Figure 10:
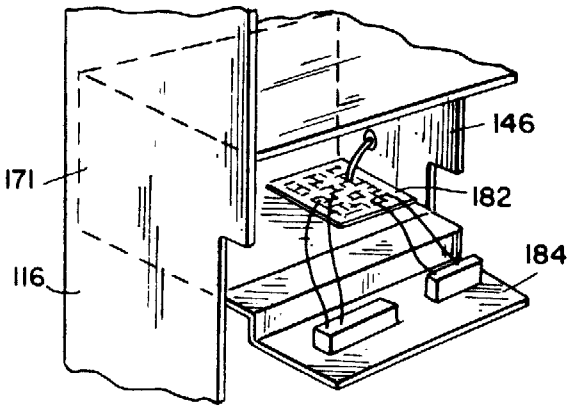
FIG. 10 is fragmentary elevational view of the power module.

FIG. 10 is a fragmentary view of power section 146 in an opened position. Power section 146 is shown opened to illustrate internal wiring and the accessibility to a printed circuit board 182. Accessibility is provided by a hinged panel 84 which can be closed to prevent unauthorized access to the contents within power section 146. The rear part of power section 146 houses the x-ray control unit.

FIG. 7 illustrates a typical installation of unitized dental operatory 110 as used by first and second dental operators. Each operator has access to his side of the generally L-shaped operatory 110. Referring to FIG. 7. we see operatory 110 duplicated as structure 110A and between them is placed assistant's stool 125A, doctor's stool 127A and dental chair 129A.

Directing our attention to operatory 110 we see that contained within the first side (inside) of L-shaped operatory 110 is doctor's stool 127, assistant's stool 125 and dental chair 129. Operatory 110 is further seen to contain dental operatory lamp 118 and X-ray unit 120 both pivotally attached to operatory 110. To the left of doctor's stool 127 is starting unit 131 which houses side delivery unit 122A. Between starting unit 131 and the first side (inside) of L-shaped operatory is contained all that is necessary for first dental operators.

Between the second side (outside) of L-shaped operatory 110 and the first side (inside) of operatory 110A is a replica of the aforedescribed operatory for the first dental operator. This replica is now available to the second dental operators who have for their use side delivery unit 122, doctor stool 127A, assistant stool 125A, and dental chair 129A. Operatory 110A has dental lamp 118A and X-ray unit 120A for use by the second dental operators.

Each dental operatory 110 contains a series of leveling devices (not shown) and a series of brackets (not shown) for adjusting each operatory 110 to compensate for an uneven floor. Operatory 110 can then be demountably fastened to the floor using the series of brackets. This demountable fastening to the floor stabilizes operatory 110 as dental light 118 is moved, X-ray unit 120 is moved to X-ray a patient or as side delivery 122 is moved.

The foregoing generally describes the most general features of dental operatory 110 and illustrates the application of operatory 110 to a plurality of dental operation systems for use in a multi-patient clinic. Operatory 110 provides the partition between individual operatories to ensure each patient privacy while at the same time not requiring extensive alteration of the room housing the plurality of dental operatory systems.

FIGS. 8 and 9 shows in greater detail the novel features of operatory 110.

The first side (inside) of L-shaped operatory 110 is shown in FIG. 8. Here is seen assistant unit 124 which is pivotally attached to operatory 110 and can be moved out for use by the assistant when sitting in assistant's chair 125 or pushed in to clear the working area. To the left of assistant unit 124 is compartment 154 which houses the analgesia unit. Access to the analgesia unit is had by pulling on handle 159. Above the analgesia unit is found an intercommunication system unit 160 for use by the first operator to send or receive information. Alongside intercom 160 are plug in connections 152 providing water and air to dental tools when required. Above the intercom unit 160 is a novel power section 146 which serves as a junction box for all the electrical equipment mounted on operatory 110. X-ray control unit 171 is shown mounted on the rear of power section 146 and control unit 171 is connected to X-ray unit 120 by the control board 182 and some of the wiring seen within power section 146. Mounted on hinged panel 184 are some components shown wired to board 182. When panel 184 is open easy access is had to all operatory 110 electrical wiring at a central location. In normal use panel 184 is closed preventing unauthorized access to the wiring.

Second cabinet 140 (FIG. 8) is located in the upper part of shorter straight portion 116 and has the following features. FIG. 8 shows the pair of sliding doors 142 which are transparent and permit the assistant to select the appropriate trays for use in assistant's unit 124. The various trays may be color coded and the color coding corresponds to particular operatory procedures. FIG. 9 shows the pair of opaque doors 170 which open to make shelves 144 accessible to a person in the rear operatory 110. Therefore, new trays can be placed onto shelves 144 from the rear and used trays removed without interferring with the area containing the first operator and patient. Cabinet 140 also contains vertically disposed compartment 141 for the storage of next patient records which can be inserted from the rear and then is accessible to either of the first operators when the next patient arrives.

Located within curved portion 114 is sink 164 which is placed so as to be accessible from the first side and second side of operatory 110. Opening 162 is designed to permit easy access to faucet set 166. Immediately below is the pair of access doors 168 for making plumbing connections to sink 164 and faucet set 166, as well as giving access to a waste receptacle which may be stored therein.

In FIG. 8 is also seen the various features of straight portion 112 which are conveniently accessible to the operator or his assistant. Specifically seen is first cabinet 130 having sliding doors and shelves within for storage of various dental supplies. Below cabinet 130 is an open space which may be used to house a computer terminal for use in recalling information if patient's records are computerized. In the base of straight portion 112 and below the open space are the first drawer set 132 and single drawer 134. It will be seen that drawer set 132 and drawer 134 are separated by a blank panel. Where the blank panel appears in FIG. 8 there is located second drawer set 180 best seen in FIG. 9, the foregoing is another feature of operatory 110.

FIG. 9 shows items which are conveniently accessible to the doctor. Seen herein is x-ray film viewer 174 which is available to the doctor for diagnostic purposes and can be readily seen by the patient. Further seen is storage compartment 176 which houses side delivery unit 122. Compartment 176 is used when it is necessary to move side delivery unit 122 out of the operatory area. FIG. 7 shows unit 122A in a position close to doctor stool 127. In this position unit 122A or unit 122 enables doctor to control the various functions of dental chair 129. Shown partially withdrawn is pull out shelf 178 which provides a temporary surface for use by the first operator or the assistant.

The second side (outside) of shorter straight portion 116 shows X-ray control unit 171 from which the first operator (doctor) controls the operation of X-ray unit 120. After placement of X-ray unit 120 near the patient's mouth the first operator retreats to the rear part of portion 116. In this position the first operator is shielded from any stray X-rays by X-ray shielding material 172 which is attached to the indicated areas of operatory 110. Operatory 110 then has an in built shielding which prevents the first operator from receiving an overdose of x-ray exposures during the course of a day when x-ray machine 120 is used on plurality of patients. Shielding material 172 also is placed to prevent stray x-ray exposure to the adjacent operator.

The embodiments of the invention particularly disclosed an described herein above is presented merely as an example of the invention. Other embodiments, forms and modifications of the invention comming within the proper scope and spirit of the appended claims, will of course, readily suggest themselves to those skilled in the art.

What is claimed is:

1. A dental operatory system comprising:

a generally L-shaped first dental operatory unit, wherein the inside of the L defines an operatory work space for a first dental operator, and wherein the outside of one leg of the L provides an operatory work space for a second dental operator, said L leg outside comprising dental operatory implements for dental operations, and means to mount said implements for accessing into said second operatory work space for use by said second dental operator, said unit further comprising dental operatory means said dental operatory means comprising an X-ray unit, and means to mount said X-ray unit on said one leg of the L-shaped unit, and means to permit alternative use of said X-ray unit by said operators in the respective operatory work spaces, and further comprising an X-ray operatory control unit, and means to mount said X-ray operatory control unit on the outside of the other leg of the L-shaped unit for use by the operators, and whereby a generally L-shaped second dental operatory unit, is spacedly positionable from and in registration with and performing the dental operatory functions as in said first unit with said one leg of said second L-shaped unit being substantially parallel to one leg of said first L-shaped unit, and the other leg of said second L-shaped unit being aligned substantially along a common rectilinear axis and in tandem with the other leg of said first L-shaped unit, so that L-shaped units may be incrementally added in registration with one another.

2. The dental operatory system of claim 1, wherein said dental operatory means comprises a dental lamp.

3. The dental operatory system of claim 1, wherein said dental operatory means comprises a sink and faucet.

4. The dental operatory system of claim 1, wherein said generally L-shaped structure comprises a first portion and a second portion joined together by a curved portion for strengthening said structure.

5. The dental operatory of claim 4, wherein said curved portion comprises a double steel wall so that said curved portion provides strength to said L-shaped structure.

6. The dental operatory of claim 5, wherein said L-shaped structure is affixed to the floor of said room, and spaced from the ceiling.

7. The dental operatory system of claim 1, further comprising x-ray shielding means being mounted to said L-shaped unit.

8. The dental operatory system of claim 1, said L-shaped unit comprising doors, communicating from the x-ray control space, said doors further comprising x-ray shielding material.

9. The dental operatory system of claim 1, said L-shaped unit comprising a dental assistant's tray, and means to swing said tray from a first position within said unit to a second position into the operatory work space.

10. The dental operatory system of claim 1, further comprising a plurality of storage drawers, and means to permit at least one drawer to open to said second operatory area work space.

11. The dental operatory system of claim 1, said L-shaped unit being formed as a curved L.

12. The dental operatory of claim 11, said curved portion being formed with reinforcing walls disposed in the inside and the outside, and said unit being floor mounted but spaced from a ceiling.

13. The dental operatory system of claim 1, said means to mount said elements comprising retractably extensible means.

14. The dental operatory system of claim 13, said elements comprising a tray.

15. The dental operatory system of claim 1, further comprising said second L-shaped operatory unit in registration with the first unit, whereby two operatory work spaces are provided, and wherein the second L-shaped unit comprises operatory elements mounted on the outside of the L to permit incremental expansion to a third unit.

16. A dental operatory system comprising:

a generally L-shaped first dental operatory unit, wherein the inside of the L defines an operatory work space for a first dental operator, and wherein the outside of one leg of the L provides an operatory work space for a second dental operator, said first unit further comprising dental operatory means, together with means to mount said dental operatory means on said one leg of said first L-shaped dental operatory unit, so as to permit alternative use of said dental operatory means by said first and second dental operators in their respective operatory work spaces, said outside of said one leg comprising means to provide dental operatory implements for use in said second operatory work space; a generally L-shaped second dental operatory unit, said second unit being in registration with and spaced from said first unit, said second unit performing substantially the same dental operatory functions as in said first unit, with one leg of said second L-shaped unit being substantially parallel to said one leg of said first L-shaped unit, and the other leg of said second L-shaped unit being aligned substantially along a common rectilinear axis and in tandem with the other leg of said first L-shaped unit, so that L-shaped units may be incrementally added in registration with one another, and said second L-shaped operatory unit being substantially identical to and in registration with said first unit so as to provide said two operatory work spaces, whereby the second L-shaped unit permits incremental expansion to a third L-shaped unit substantially identical to, and in registration with, said first and second units.

17. The dental operatory system of claim 16 in which a dental operatory element is mounted in the first L-shaped dental operatory unit, at the junction of the one leg and the other leg of the first unit, so as to permit alternative use of said dental operatory element by the first and second dental operators in their respective operatory work spaces.

18. The dental operatory system of claim 17 in which the dental operatory element is a sink-and-faucet combination.

*19. A dental operatory system comprising:*

*a generally L-shaped first dental operatory unit, wherein the inside of the L defines an operatory work space for a first dental operator, and wherein the outside of one leg of the L provides an operatory work space for a second dental operator, said first unit further comprising dental operatory means, together with means to mount said dental operatory means on said one leg of said first L-shaped dental operatory unit, so as to permit alternative use of said dental operatory means by said first and second dental operators in their respective operatory work spaces, said outside of said one leg comprising means to provide dental operatory implements for use in said second operatory work space; a generally L-shaped second dental operatory unit, said second unit being in registration with and spaced from said first unit, said second unit performing substantially the same dental operatory functions as in said first unit, with one leg of said second L-shaped unit being substantially parallel to said one leg of said first L-shaped unit, and the other leg of said second L-shaped unit being aligned substantially along a common rectilinear axis and in tandem with the other leg of said first L-shaped unit, so that L-shaped units may be incrementally added in registration with one another, and said second L-shaped operatory unit being substantially identical to and in registration with said first unit so as to provide said two operatory work spaces, whereby the second L-shaped unit permits incremental expansion to a third L-shaped unit substantially identical to, and in registration with, said first and second units, each of said first and second operatory work spaces being adapted to receive a respective dental chair, each of said dental chairs being capable of being aligned substantially parallel to and spaced from the one leg of its respective L-shaped dental operatory unit, with the operative end of said dental chair being juxtaposed and disposed adjacent the junction of the one leg and the other leg of the respective L-shaped dental operatory unit.*

*20. The dental operatory system of claim 19 in which the dental operatory means comprises a pivotally attached dental operatory lamp.*

*21. The dental operatory system of claim 19 in which the dental operatory means comprises a pivotally attached X-ray unit.*

*22. The dental operatory system of claim 19 in which a dental operatory element is mounted in the first L-shaped dental operatory unit, at the junction of the one leg and the other leg of the first unit, said junction of said legs being continuous above and below said dental operatory element, but discontinuous at said dental operatory element, so that said element is accessible from both said first and second operatory work spaces, so as to permit alternative use of said dental operatory element by the first and second dental operators in their respective operatory work spaces.*

*23. The dental operatory system of claim 22 in which the dental operatory element is a sink-and-faucet combination.*

*24. The dental operatory system of claim 19 in which retractably extensible means comprising a dental operatory tool is mounted to a partition below a rectangular recess.*

*25. A dental operatory system comprising:*

*a generally L-shaped unitary modular first dental operatory unit, wherein the inside of the L defines an operatory work space for a first dental operator, and wherein the outside of one leg of the L provides an operatory work space for a second dental operator, said first unit further comprising dental operatory means together with means to mount said dental operatory means on said one leg of said first L-shaped dental operatory unit, so as to permit common and dual accessibility and alternative use of said dental operatory means by said first and second dental operators in their respective operatory work spaces, said operatory work spaces being oriented in areas disposed on opposite sides of said one leg of said first L-shaped dental operatory unit, the inside of the other leg of said first L-shaped dental operatory unit comprising means to provide dental operatory implements for use in said first operatory work space, said outside of said one leg comprising means to provide dental operatory implements for use in said second operatory work space; a generally L-shaped unitary modular second dental operatory unit, said second unit being in regis-*

*tration with and spaced from said first unit, said second unit performing substantially the same dental operatory functions as in said first unit, with one leg of said second L-shaped unit being substantially parallel to said one leg of said first L-shaped unit, and the other leg of said second L-shaped unit being aligned substantially along a common rectilinear axis and in tandem with the other leg of said first L-shaped unit, so that L-shaped units may be incrementally added in registration with one another, and said second L-shaped operatory unit being substantially identical to and in registration with said first unit so as to provide said two operatory work spaces, whereby the second L-shaped unit permits incremental expansion to a third L-shaped unitary modular unit substantially identical to, and in registration with, said first and second units, each of said first and second operatory work spaces being adapted to receive a respective dental chair, each of said dental chairs being capable of being aligned substantially parallel to and spaced from the one leg of its respective L-shaped dental operatory unit, with the operative end of said dental chair being juxtaposed and disposed adjacent the junction of the one leg and other leg of the respective L-shaped dental operatory unit, retractably extensible means including a dental operatory tool mounted to a partition below a rectangular recess, a dental operatory element comprising a sink-and-faucet combination being mounted in the first L-shaped dental operatory unit, at the junction of the one leg and the other leg of the first unit, said junction of said legs being continuous above and below said dental operatory element, but discontinuous at said dental operatory element, so that said element is accessible from both said first and second operatory work spaces, so as to permit alternative use of said dental operatory element by the first and second dental operators in their respective operatory work spaces.*

*26. The dental operatory system of claim 25 in which the dental operatory means comprises a pivotally attached dental operatory lamp.*

*27. The dental operatory system of claim 25 in which the dental operatory means comprises a pivotally attached X-ray unit.*

*28. The dental operatory system of claim 25 in which the means to mount the dental operatory means on the one leg of the first L-shaped dental operatory unit, so as to permit common and dual accessibility and alternative use of the dental operatory means by the first and second dental operators in their respective operatory work spaces oriented in areas disposed on opposite sides of the one leg of the first L-shaped dental operatory unit, comprises a pass through cabinet.*

*29. The dental operatory system of claim 28 in which shielding material against X-rays is disposed about the pass through cabinet, and on the outside of the legs of the first L-shaped dental operatory unit.*

*30. A dental operatory system comprising:*

*a generally L-shaped unitary modular dental operatory unit, wherein the inside of the L defines an operatory work space for a first dental operator, and wherein the outside of one leg of the L provides an operatory work space for a second dental operator; said unit further comprising dental operatory means, together with means to mount said dental operatory means on said one leg of said L-shaped dental operatory unit, so as to permit common and dual accessibility and alternative use of said dental operatory means by said first and second dental operators in their respective operatory work spaces, said operatory work spaces being oriented in areas disposed on opposite sides of said one leg of said L-shaped dental operatory unit, the inside of the other leg of said L-shaped dental operatory unit comprising means to provide dental operatory implements for use in said first operatory work space, said outside of said one leg comprising means to provide dental operatory implements for use in said second operatory work space; said first operatory work space being adapted to receive a respective dental chair, said dental chair being capable of being aligned substantially parallel to and spaced from the one leg of its respective L-shaped dental operatory unit, with the operative end of said dental chair being juxtaposed and disposed adjacent the junction of the one leg and other leg of the respective L-shaped dental operatory unit, retractably extensible means including a dental operatory tool mounted to a partition below a rectangular recess, a dental operatory element comprising a sink-and-faucet combination being mounted in the L-shaped dental operatory unit, at the junction of the one leg and the other leg of the first unit, said junction of said legs being continuous above and below said dental operatory element, but discontinuous at said dental operatory element, so that said element is accessible from both said first and second operatory work spaces, so as to permit alternative use of said dental operatory element by the first and second dental operators in their respective operatory work spaces.*

*31. The dental operatory system of claim 30 in which the dental operatory means comprises a pivotally attached dental operatory lamp.*

*32. The dental operatory system of claim 30 in which the dental operatory means comprises a pivotally attached X-ray unit.*

*33. The dental operatory system of claim 30 together with a generally L-shaped unitary modular second dental operatory unit, said second unit being in registration with and spaced from the first unit, said second unit performing substantially the same dental operatory functions as in the first unit, with one leg of said second L-shaped unit being substantially parallel to said one leg of the first L-shaped unit, and the other leg of said second L-shaped unit being aligned substantially along a common rectilinear axis and in tandem with the other leg of the first L-shaped unit, so that L-shaped units may be incrementally added in registration with one another, and said second L-shaped operatory unit being substantially identical to and in registration with the first unit so as to provide said two operatory work spaces, whereby the second L-shaped unit permits incremental expansion to a third L-shaped unitary modular unit substantially identical to, and in registration with, said first and second units, each of the first and second operatory work spaces being adapted to receive a respective dental chair, each of said dental chairs being capable of being aligned substantially parallel to and spaced from the one leg of its respective L-shaped dental operatory unit, with the operative end of each dental chair being juxtaposed and disposed adjacent the junction of the one leg and the other leg of the respective L-shaped dental operatory unit.*

*34. The dental operatory system of claim 30 in which the means to mount the dental operatory means on the one leg of the first L-shaped dental operatory unit, so as to permit common and dual accessibility and alternative use of the dental operatory means by the first and second dental operators in their respective operatory work spaces oriented in areas disposed on opposite sides of the one leg of the first L-shaped dental operatory unit, comprises a pass through cabinet.*

*35. The dental operatory system of claim 34 in which shielding material against X-rays is disposed about the pass through cabinet, and on the outside of the legs of the first L-shaped dental operatory unit.*

* * * * *